Aug. 18, 1936.   H. G. JENNINGS ET AL   2,051,526
MEANS FOR PRODUCING SPECIAL EFFECTS IN MOTION PICTURE PHOTOGRAPHY
Filed Aug. 13, 1934   8 Sheets-Sheet 1

Fig. 1

Inventors
Henry Gordon Jennings,
Paul K. Lerpet,
Arthur Zaugg.

Attorney.

Aug. 18, 1936.   H. G. JENNINGS ET AL   2,051,526
MEANS FOR PRODUCING SPECIAL EFFECTS IN MOTION PICTURE PHOTOGRAPHY
Filed Aug. 13, 1934   8 Sheets-Sheet 3

Aug. 18, 1936.    H. G. JENNINGS ET AL    2,051,526
MEANS FOR PRODUCING SPECIAL EFFECTS IN MOTION PICTURE PHOTOGRAPHY
Filed Aug. 13, 1934    8 Sheets-Sheet 4

Inventors
Henry Gordon Jennings,
Paul K. Lerpee,
Arthur Zaugg.

James T. Brickelew
Attorney.

Aug. 18, 1936.    H. G. JENNINGS ET AL    2,051,526
MEANS FOR PRODUCING SPECIAL EFFECTS IN MOTION PICTURE PHOTOGRAPHY
Filed Aug. 13, 1934    8 Sheets-Sheet 5

Inventors
Henry Gordon Jennings,
Paul K. Lerpee,
Arthur Zaugg.

Attorney.

Aug. 18, 1936.   H. G. JENNINGS ET AL   2,051,526
MEANS FOR PRODUCING SPECIAL EFFECTS IN MOTION PICTURE PHOTOGRAPHY
Filed Aug. 13, 1934    8 Sheets-Sheet 7

Inventors
Henry Gordon Jennings,
Paul K. Lerpee,
Arthur Zaugg.

Attorney.

Aug. 18, 1936.  H. G. JENNINGS ET AL  2,051,526
MEANS FOR PRODUCING SPECIAL EFFECTS IN MOTION PICTURE PHOTOGRAPHY
Filed Aug. 13, 1934   8 Sheets—Sheet 8

Inventors
Henry Gordon Jennings,
Paul K. Lerpée,
Arthur Zaugg.

Attorney.

UNITED STATES PATENT OFFICE 2,051,526

MEANS FOR PRODUCING SPECIAL EFFECTS IN MOTION PICTURE PHOTOGRAPHY

Henry Gordon Jennings, Paul K. Lerpée, and Arthur Zaugg, Los Angeles, Calif., assignors to Paramount Productions, Inc., Los Angeles, Calif., a corporation of Delaware Application August 13, 1934, Serial No. 739,544

20 Claims. (Cl. 88—16)

This invention relates generally to production of special effects in motion picture photography, and to special projection printers adapted to the purpose of producing various trick and special effects in motion picture photography.

It is an object of the present invention to provide a printer which greatly facilitates production of certain types of special effects frequently employed in motion picture photography.

It is a further object of the invention to provide a printer of the general character mentioned capable of adjustment and operation to produce an extremely wide variety of special novel effects, and it is also an object of the invention to provide novel apparatus for producing various special and trick effects.

It may be preliminarily stated that the printer of the present invention involves generally a motion picture projector adapted to project an image of the film on a screen, and a motion picture camera adapted to photograph that image. Means are provided for adjusting and moving the projector, the screen and the camera in various combinations of ways to achieve a great variety of special effects, and for driving the projector and camera properly throughout all such movements. The details of these arrangements, and of certain subsidiary equipment, as well as the kinds of effects obtainable therewith, will best be left to be described in the body of the specification.

Reference is now directed to the accompanying drawings showing a present typical illustrative embodiment of the invention, wherein.

Figure 1:
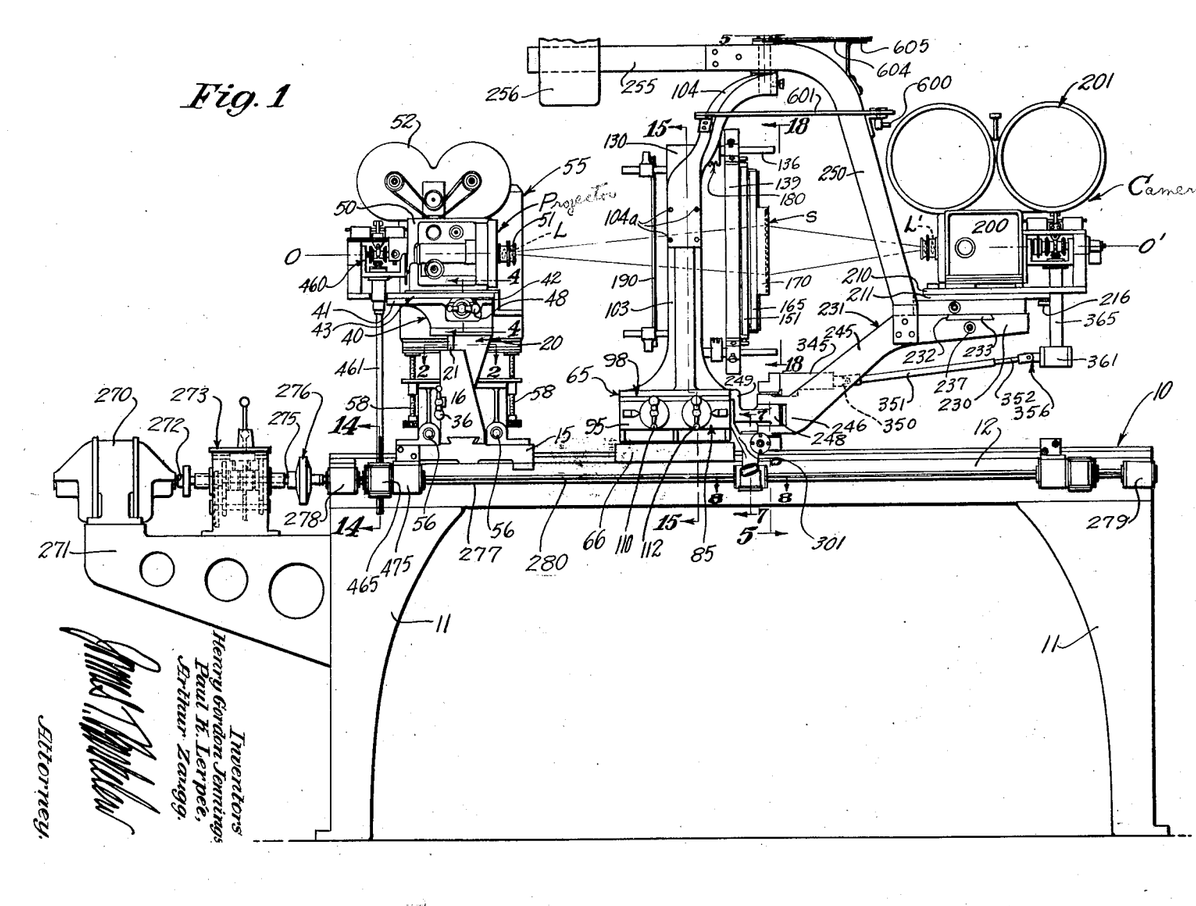
Fig. 1 is a side elevation of the printer.
Figures 2, 3, 14A:
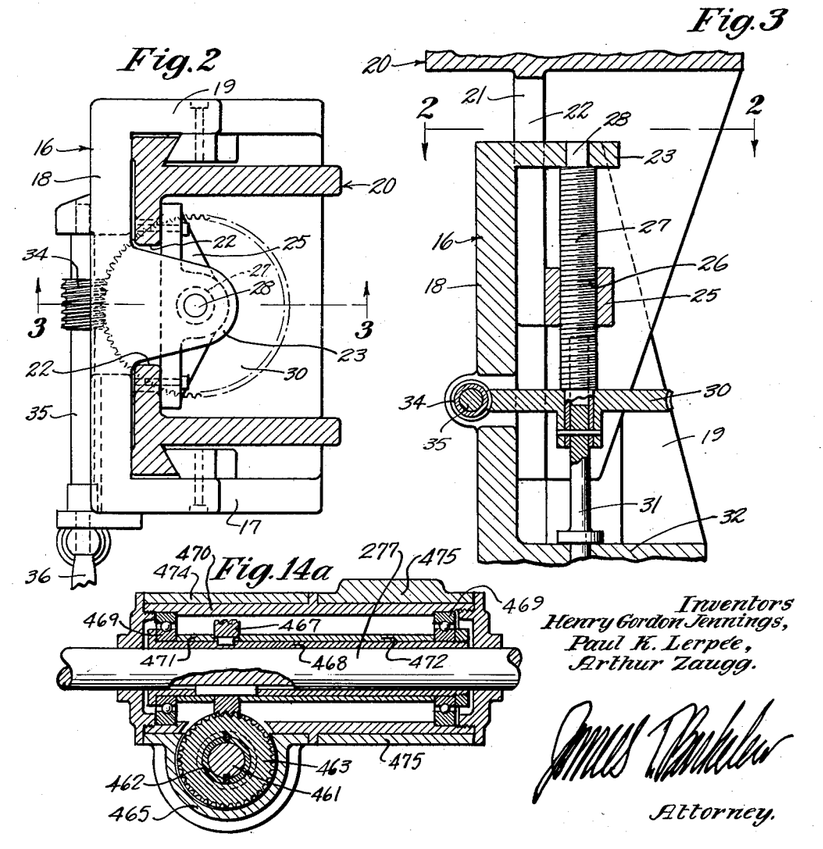
Fig. 2 is a detail section taken on line 2—2 of Figs. 1 and 3.
Fig. 3 is a vertical medial section of the projector mounting, being a view taken on the plane indicated by line 3—3 of Fig. 2.
Fig. 14a is a detail section on line 14a—14a of Fig. 14.
Figure 4:
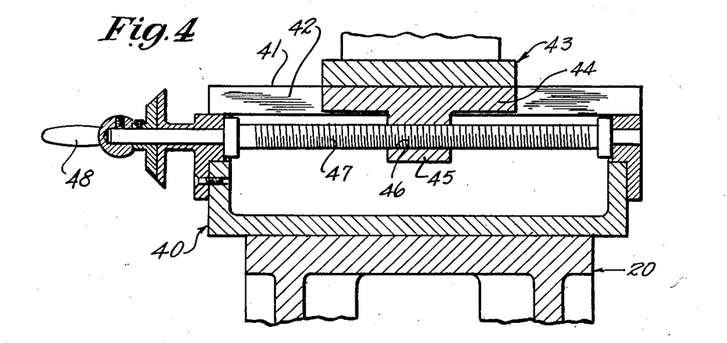
Fig. 4 is a detail section taken on line 4—4 of Fig. 1.
Figures 15, 16, 17:
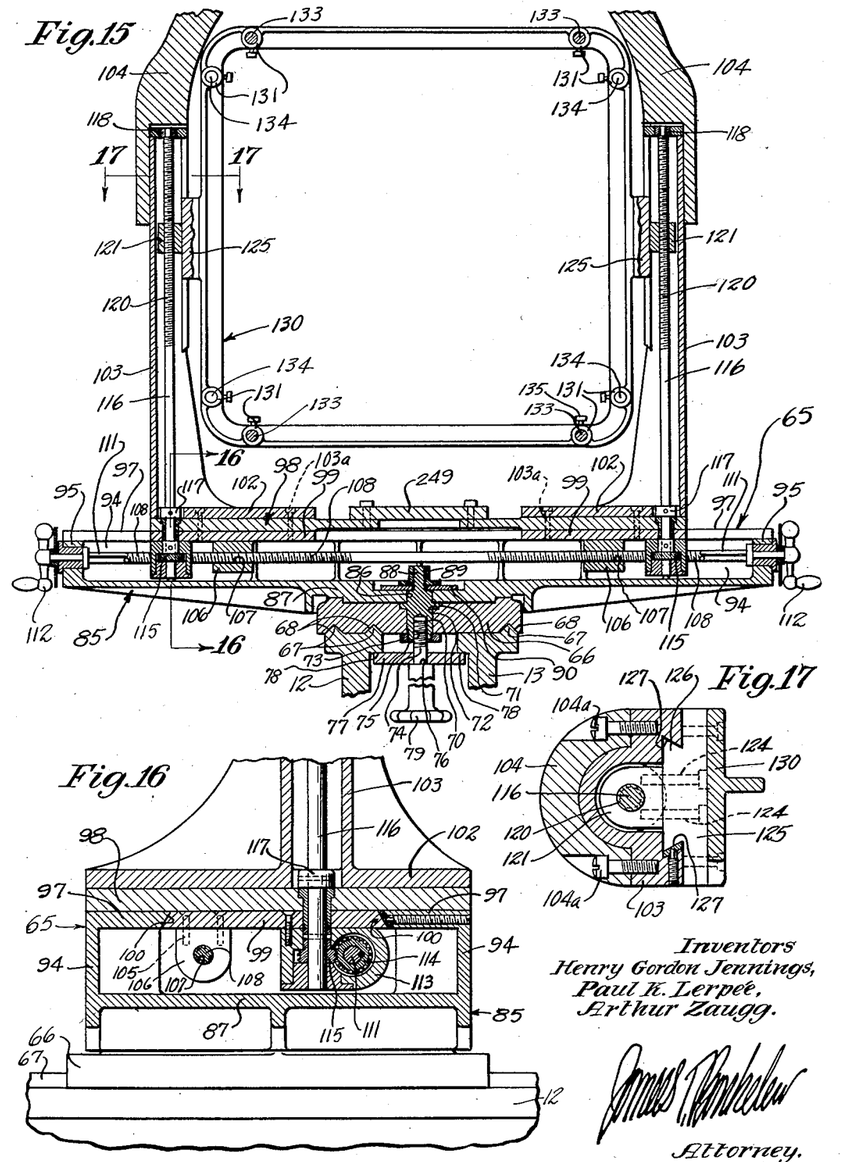
Fig. 15 is a vertical transverse section taken on line 15—15 of Fig. 1.
Fig. 16 is a section taken on line 16—16 of Fig. 15.
Fig. 17 is a view taken on line 17—17 of Fig. 15.

In Fig. 1 numeral 10 designates the base of the printer, and this base is preferably a lathe bed comprising legs 11 and a pair of longitudinally running carriage rails 12 and 13 (see also Fig. 15). Mounted on the left hand end of rails 12 and 13, as viewed in Fig. 1, is a supporting base 15 for a projector and lamp house. Base 15 carries a vertically extending casting 16 having vertical walls 17, 18 and 19 (see Fig. 2). A projector elevating casting 20 has a downwardly extending wall portion 21 adapted to slide vertically adjacent the inner surface of wall 18, and is provided with a vertical slot 22 adapted to receive a projection 23 which extends inwardly from wall 18, all as indicated in Figs. 2 and 3. Mounted on the inner surface of wall 21 is a nut member 25 having a vertical screw-threaded bore 26 through which passes a screw-member 27. The upper end of member 27 has a reduced upper extremity 28 which is journaled for rotation in the inward projection 23 of casting 16, and on the lower end of a member 27 there is mounted a worm wheel 30. The lower end of screw member 27 is also mounted rigidly on the upper end of a shaft 31 journaled at its lower end in lower casting wall 32. Meshing with worm wheel 30 is a worm 34 which is on a shaft 35 journaled for rotation in casting 16 and having on its outer end a hand crank 36. It will be evident that rotation of crank 36 acts through worm 34 and worm wheel 30 to rotate screw member 27 and so operate on nut 25 to raise or lower projector elevating casting 20 with reference to lower casting 16.

Resting on the upper surface of elevator 20 is a casting 40 having a horizontal upper wall 41 cut with a transverse dove-tail way 42. A projector carrying platform 43 is mounted to slide transversely on the upper surface of said plate 41, and has affixed thereto a dove-tail projection 44 which is received in and guided by way 42. A nut element 45 depending from member 44 is provided with a screw-threaded transversely extending bore 46 which receives a screw-threaded shaft 47 journaled at its two ends in suitable bearings supported by member 40, one end of said shaft being provided with a manual crank 48. It will be evident that rotation of crank 48 causes platform 43 to move transversely across member 40.

Thus the projector P, which is secured down to platform 43 in any suitable manner, may be adjusted vertically by rotation of crank 36, and may be shifted transversely of the printer bed by rotation of crank 48.

Figure 22:
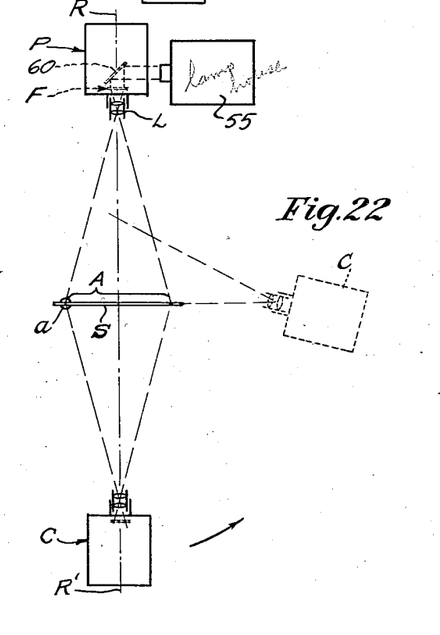
Fig. 22 is a diagrammatic view illustrating one type of shot for which the printer is designed.

The projector here shown is simply a converted motion picture camera of conventional type, comprising body 50, lens mount 51 having lens L, adjustable for focusing in the usual manner, and film reel support 52. A lamp house 55 is provided for the projector on the side opposite that viewed in Fig. 1, and is mounted on parallel horizontal rods 56 which project laterally from mountings 57 carried by base casting 15. The lamp house may be adjusted in a direction toward and from the projector by sliding on rods 56, and may be adjusted vertically by means of screws 58, so as to accommodate any projector position. As indicated in Fig. 22, the lamp house projects light into the side of projector P against a 45 degree mirror 60 positioned to the rear of the film F in the projector, the light rays being reflected from 60 to pass through the film to the projection lens L in mounting 51. The size of the image projected on the projection screen may be controlled by moving the projector back and forth on its base and focusing lens L.

The central screen and camera carriage is designated generally at 65, and is provided with a base casting 66 (Figs. 1 and 15) which rests down and is adapted to slide longitudinally on bed rails 12 and 13. As shown in Fig. 15, rails 12 and 13 are provided with raised longitudinally running projections or beads 67, and these are received within complementary guide grooves 68 formed in the under side of member 66. Member 66 is thus arranged to slide longitudinally on the bed rails and is prevented from shifting laterally thereon. A spindle 70 extends through the central portion of member 66, and is positioned by means of an annular flange 71 received within countersink 72 formed in the top side of member 68, and a nut 73 screw-threaded on the lower end of spindle 70 and set up against the lower side of base member 66. Member 66 may be clamped against longitudinal movement on rails 12 and 13 by tightening up a clamp screw 74 which screw-threads into a socket 75 in the lower end of spindle 70, screw 74 having a shoulder 76 which engages against a washer 77 engaging in turn against the under side of rail flanges 78. Screw 74 has a hand wheel 79 on its lower end for convenience of manual manipulation. It will be evident that this screw may be tightened to bind carriage base 66 against longitudinal movement on the bed rails, or it may be set up with just sufficient tightness to steady the parts mounted on member 66, without binding sufficiently to prevent sliding of member 66 on the rails for adjustment purposes. When the carriage is in proper position, however, this screw is preferably tightened to prevent accidental displacement.

Resting on the upper side of base member 66 is a transversely extending supporting casting 85. The previously mentioned spindle 70 extends upwardly through a bore 86 in the lower wall 87 of this casting, and has a reduced and screw-threaded upper extremity 88 on which is screw-threaded a nut 89 which bears downwardly on a washer 90 engaging downwardly on wall 87. This nut 89 holds casting 85 and the parts mounted thereon in assembly with base member 66.

Supporting casting 85 is box shaped, having, in addition to lower wall 87, sides 94, ends 95 and top 97. Resting on top wall 97 is a platform 98, to the underside of which is secured a dove-tail member 99 (Figs. 15 and 16) which is received within and guided by a dove-tailed way 100 formed in wall member 97. Dove-tail 99 and way 100 are disposed transversely of longitudinal bed rails 12 and 13, as shown. Mounted on opposite ends of platform 98 are the base flanges 102 of vertically extending supporting standards 103, screws 103a serving to hold members 98, 99 and 103 in assembly. To the upper ends of standards 103 are secured the lower ends of the depending arms of a yoke member 104, screws 104a holding the yoke in position (Fig. 17). Standards 103 and yoke 104 support the projection-screen carrying frame and other members, as hereinafter to be detailed.

Secured to the under side of dove-tail members 99, as by means of screws 105, are nut members 106 provided with screw-threaded bores 107 through which pass a lead screw 108 which is journaled at its two ends in casting ends 95, and is provided at its two extremities with operating cranks 110. Rotation of shaft 108 by operation of either of these cranks accordingly causes movement of platform 98 and standards 103 in a direction longitudinally of way 100, and therefore transversely of bed rails 12 and 13.

Journaled in casting ends 95 parallel to lead screw 108 is a shaft 111, the two extremities of which are provided with operating cranks 112. Splined on shaft 111, and encased by housing members 113 attached to dove-tail member 99 (see Fig. 16), is a pair of spiral gears 114 which mesh with spiral gears 115 on the lower ends of vertical shafts 116 which extend upwardly through vertical standards 103 (Figs. 15 and 16). When platform 98 moves transversely across the printer bed, these gears 114 slide along shaft 111. Each of shafts 116 is provided with a thrust bearing at 117, and is journaled in its upper end in a bearing 118 carried at the extreme upper end of standard 103. The upper portions of shafts 116 are screw-threaded, as at 120, and nut members 121 mounted thereon are moved vertically when shafts 116 are rotated. These members 121 are secured, as by screws 124, to carrier members 125 provided with dove-tailed portions 126 which slide within vertical dove-tail ways 127 formed in the inner sides of standards 103, as clearly indicated in Fig. 17. To the inner side of said members 125 are secured the vertical sides of a rectangular frame 130, which is preferably of T cross-section, as indicated in Fig. 17.

Thus by operation of crank 110, platform 98 and the standards 103 and frame 130 carried thereby are caused to move transversely across the bed of the printer, while by operation of crank 112, shafts 116 are caused to rotate to move frame 130 in a vertical direction. Frame 130 is also adjustable longitudinally of the printer bed by moving base member 66 on rails 12 and 13.

Figures 18, 19, 20:
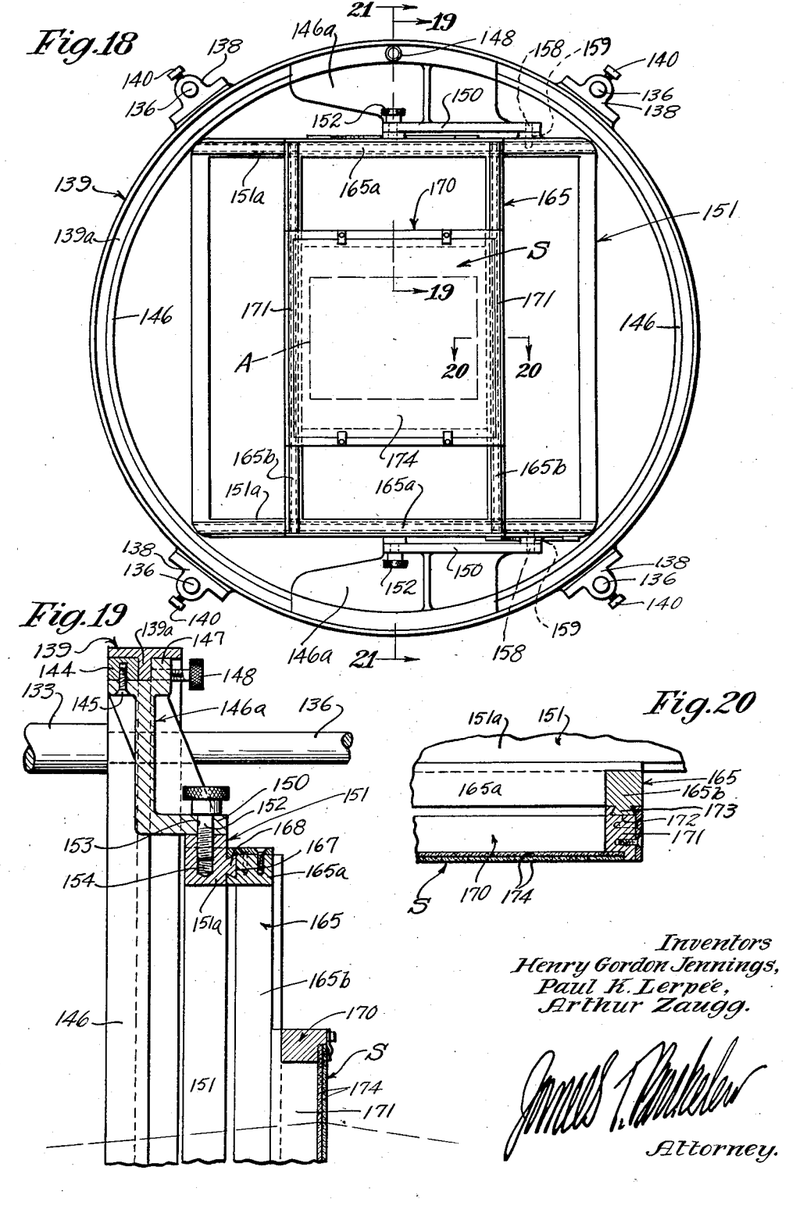
Fig. 18 is a view of the projection screen mounting, being taken in the direction of arrows 18—18 in Fig. 1.
Fig. 19 is a detail section taken on line 19—19 of Fig. 18.
Fig. 20 is a detail section taken on line 20—20 of Fig. 18.
Figure 21:
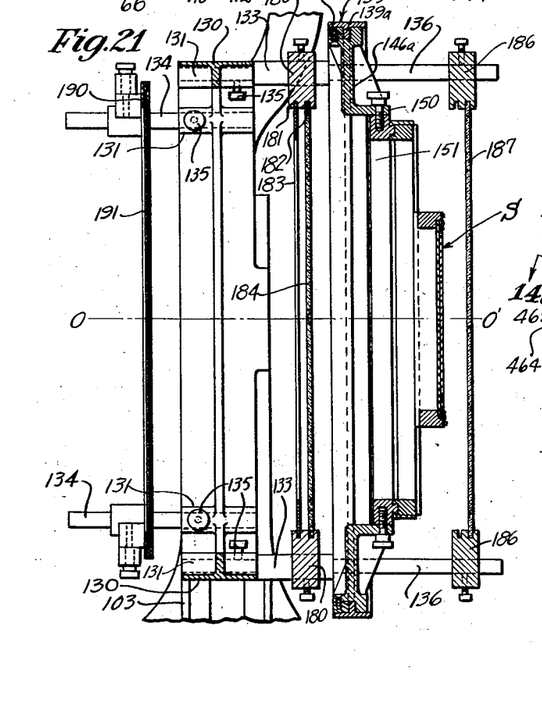
Fig. 21 is a vertical medial section taken on the plane indicated by line 21—21 of Fig. 18.

This adjustable frame 130 carries a projection screen on which projector P casts its image, and also carries various auxiliary screen and matting devices. As shown in Figs. 15 and 21, frame 130 is provided with eight supporting-rod sockets 131, two adjacent each corner. A forwardly projecting supporting rod 133 is placed in one socket at each corner of frame 130, and a rearwardly projecting rod 134 is placed in the other socket at each corner of the frame. The sockets are provided with clamp screws 135 adapted to be set up against these rods to hold them tightly in position. Rods 133 are provided with reduced portions 136 and mounted thereon are mountings 138 which are secured to the periphery of a carrying ring 139, said ring being of T-shaped cross section, as indicated in Fig. 18. Clamp screws 140 are provided in mountings 138 and are adapted to be set up against rod portions 136 to adjust the ring in position. Received within the inner side of ring 139 and engaging ring flange 139a is a holding ring 144, and secured within ring 144 as by means of screws 145, is a supporting ring 146 provided with diametrically opposite inwardly casting portions 146a, the latter having flanges 147 engaging the side of ring flange 139a which is opposite to ring 144 to hold the parts in assembly, as shown in Fig. 19. Clamp screws 148 in flanges 147 are adapted to be set up against ring flange 139a to clamp the assembly 144, 146 in rotatably adjusted positions within carrier ring 139.

Casting portions 146a have lateral flanges 150, between which is pivotally mounted a rectangular screen carrying frame 151. The pivotal mounting for each side of said frame comprises a screw 152 passing through an aperture 153 in flange 150 and screw-threading into a socket 154 formed in the adjacent side of frame member 151. As shown in the drawings, the pivotal axis so provided for frame 151 intersects the optical center line O—O' of the printer. Another pivotal axis for frame 151 is provided parallel to but offset laterally from the axis just described. For this purpose flanges 150 are provided with offset apertures 158 which are adapted to aline with offset screw-threaded sockets 159 provided in the sides of frame 151. When it is desired to pivot frame 151 on the latter axis, screws 152 are removed from sockets 154 and inserted through apertures 158 and screw-threaded into engagement with sockets 159. Thus frame 151 may be swung on an axis which intersects the optical axis of the printer, or on an axis which is laterally offset therefrom and which may, for instance, be brought into coincidence with one edge of the image cast on the screen by the projector, as will be more fully explained hereinafter.

A rectangular frame 165 is mounted to slide on the parallel pivoted members 151a of frame 151, and for this purpose the two opposite end members 165a of member 165 are provided with dove-tail ways 167, which receive and are guided by longitudinal dove-tail projections 168 formed on the outer surfaces of members 151a (Fig. 19). A rectangular frame 170 is arranged in similar manner to slide on the parallel members 165b of frame 165, and for this purpose its parallel members 171 are formed with dove-tail ways 172 adapted to receive and be guided by dove-tail projections 173 formed on member 165b. Frame 170 carries the projection screen S which may be of any suitable type; for instance, it may be formed of two clear sheets of glass 174, between which is a thin membrane adapted to receive a projected image. Such a screen is well known and will require no further description here.

As will be noted from Fig. 18, frame 165 is of a width approximately half that of frame 151, while frame 170, which is approximately square, has a side dimension approximately half the length of frame 165. It will be evident that by moving frame 165 on frame 151 and frame 170 on frame 165, the projection screen may be shifted about over a considerable area. The rectangle designated at A in Fig. 18 represents the area of the image projected on screen S, and it will be evident that sufficient latitude of movement of screen S is provided that either of the four edges of area A may be brought into alinement with the axis of carrier ring 139, which is the normal optical center line of the printer. The purpose and the use of these adjustments will appear hereinafter.

As shown in Figs. 1 and 21, a pair of frame members 180 are mounted on rods 133 between ring 139 and rod supporting frame 130, and are provided with ways 181 and 182 adapted to slidably receive mats or screens such as indicated at 183 and 184.

In Fig. 21 a frame 186 is shown mounted on the extreme outer ends of supporting rod portions 136, and is shown carrying a glass plate 187 a short distance outside of screen S. This screen 187 is used in certain effects to carry foreground figures which are desired to be inserted in the final picture. In the majority of instances frame 186 and its screen 187 will be removed from the rods.

Frame 190 is also shown slidably mounted on rearwardly projecting supporting rods 134, and this frame carries a glass plate 191, which is in a plane somewhat to the rear of projection screen S, and is used to carry "soft" or out-of-focus mats in certain types of shots. When not in use, frame 190 and plate 191 are removed from the printer.

The camera which photographs the image cast by projector P on screen S is designated at C in Fig. 1. This camera, which comprises body 200, objective lens combination L', adjustable for focusing in the usual manner, and magazine 201, is mounted for longitudinal and transverse adjustment movement, and also for swinging movement about a vertical axis which lies in the plane of projection screen S.

Figure 6:
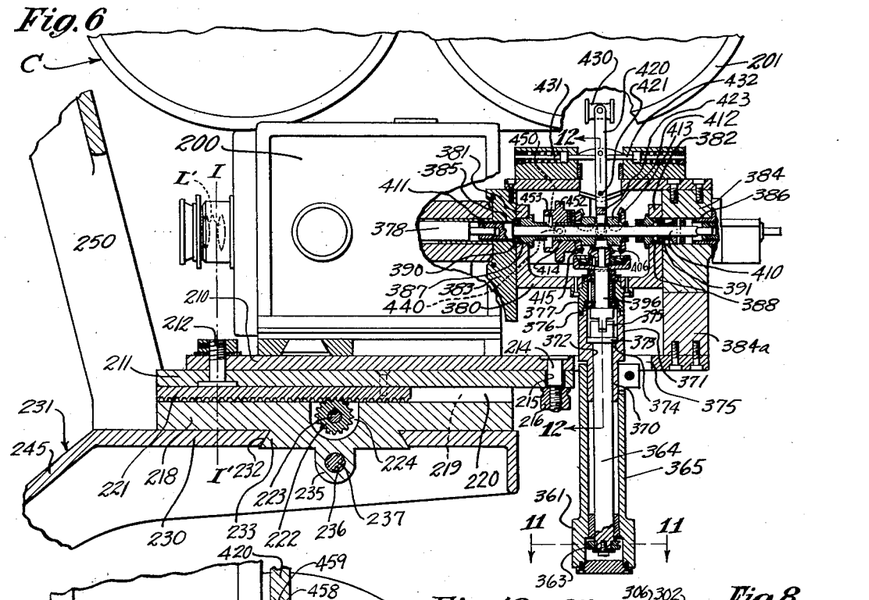
Fig. 6 is a section taken on broken line 6—6 of Fig. 5, portions of the camera body forwardly of the section plane being shown in elevation.

As shown in Fig. 6, the camera body rests on a supporting plate 210, which rests in turn on a second supporting plate 211. Plate 210 is pivoted to plate 211 by means of pin 212 on a vertical axis I—I' (Fig. 6), and the camera lens L' is adapted to be adjusted to a position in which its rear nodal point N is intersected by said axis. The purpose of this relation will be explained hereinafter.

Figures 5, 7, 9, 10:
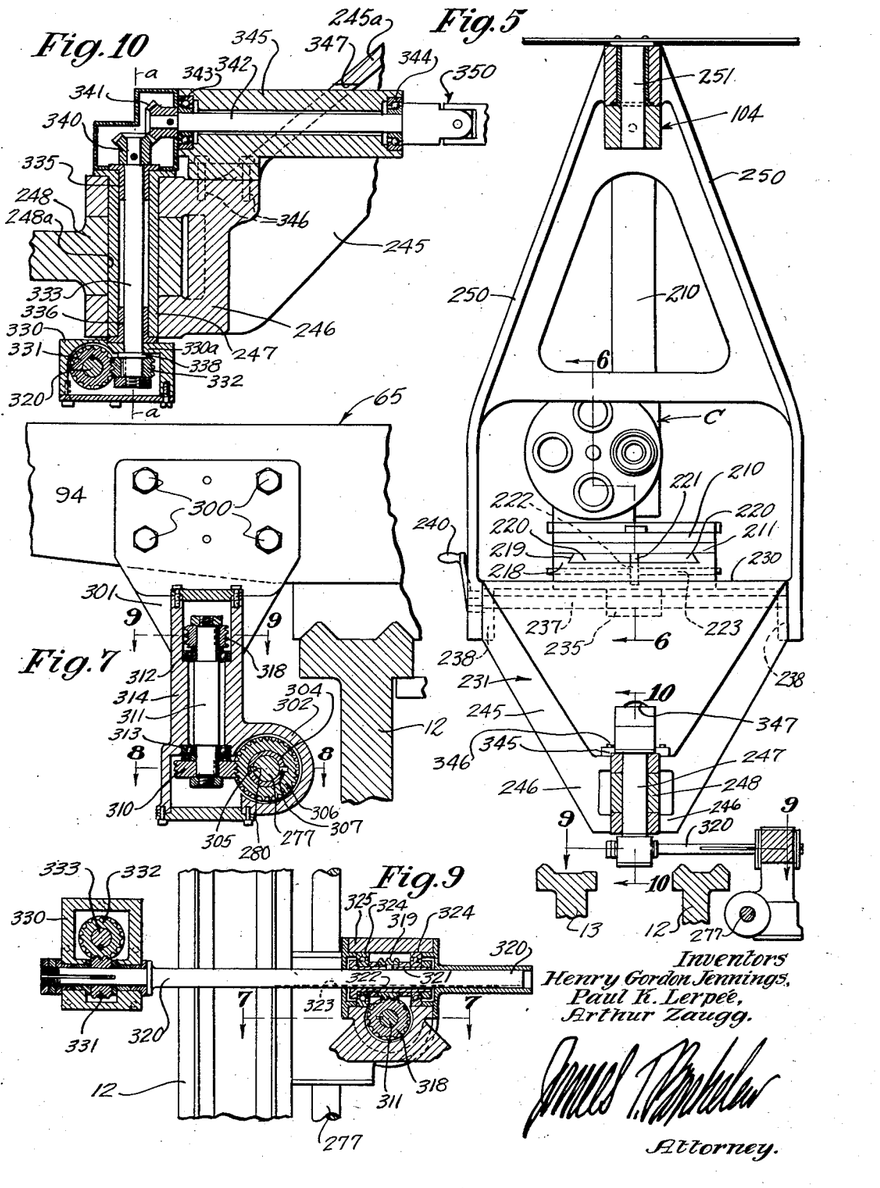
Fig. 5 is a vertical transverse section taken as indicated by line 5—5 of Fig. 1.
Fig. 7 is a detail section taken on line 7—7 of Figs. 1 and 9.
Fig. 9 is a section taken on line 9—9 of Figs. 5 and 7.
Fig. 10 is a section taken on line 10—10 of Fig. 5.

Plate 210 carries near its rear edge a pin 214 which extends downwardly through an arcuate slot 215 in lower plate 211 and is screwthreaded at its lower end to receive a clamping nut 216, said nut being adapted to be set up against the under side of plate 211 to clamp the two plates in pivotally adjusted position. Plate 211 rests on a base member 218, the upper surface of which is cut with a longitudinal dove-tail way 219 (Figs. 5 and 6). Secured to the under side of plate 211 are projections 220 forming a dove-tail which is received within way 219. Also secured to the under side of plate 211 and disposed between members 220 is a rack 221 which meshes with a gear 222 fast on a shaft 223 extending transversely through and journaled in base member 218, a cavity 224 being provided in member 218 to accommodate gear 222. Shaft 223 has squared ends projecting from both sides of member 218, which are adapted to be engaged by a hand crank, not shown. Rotation of shaft 233 by means of such a crank effects operation of a gear 222 and rack 221 to move the camera carrying plates forwardly or rearwardly on member 218.

Base member 218 rests on the horizontal platform 230 of a swinging camera carrier generally designated by numeral 231. Platform 230 is cut with a transverse dove-tail way 232 which receives a dove-tail projection 233 formed on the under side of base member 218, and a lug 235 depending from dove-tail portion 233 has a screw-threaded bore 236 which receives a lead screw shaft 237 journaled at its two ends in side wall portions 238 of platform 230. The two projecting ends of shaft 237 are squared, as indicated in Fig. 1, to be drivingly engaged by a manual crank 240, as in Fig. 5. It will be evident that operation of crank 240 causes base member 218 to move transversely across platform 230.

The camera carrying platform 230 of swinging carrier 231 forms the upper portion of a casting 245 extending angularly downwardly from platform 230 to a yoke 246 (Figs. 1, 5 and 10), said yoke carrying a vertical bearing sleeve 247. The arms of yoke 246 fit over a supporting arm 248 having a vertical bore 248a which rotatably receives bearing sleeve 247. The engaging surfaces between arm 248 and the arms of yoke 246 are machined to rotate on one another. Arm 248 is on the outer end of a bracket member 249 which extends over and is secured down to the previously described supporting platform 98 on central carriage 65 (see also Fig. 15), the camera thus being carried by the same carriage 65 that supports the projection screen. Bracket 249, which will be seen to support the lower portion of camera carrier casting 245, is so arranged that the vertical axis a of hollow shaft 247 lies in the vertical plane of projector screen S, this being an important feature of the printer, as will appear hereinafter.

Secured to camera platform 230 is a supporting casting 250, which extends upwardly from said platform and then turns over yoke member 104 and rests on the upper side thereof. A vertical pivot pin 251 carried by yoke member 104 in alignment with the aforementioned swinging carrier pivot shaft 247 projects upwardly through the overlying portion of casting 250, as indicated in Figs. 1 and 5. For the purpose of steadying the camera carrier, casting 250 has a counter-balancing arm 255 extending from pivot 251 in a direction opposite to the camera platform, said arm carrying a counter-balance weight 256.

Thus the swinging camera carrier, which comprises camera platform casting 245 together with supporting casting 250, is mounted on the transversely shiftable projection screen carriage 65 and is so arranged that the vertical axis of the swinging camera carrier lies in the plane of projection screen S.

The projector and camera are driven by an electric motor 270 mounted on a bracket 271 extending from one end of the printer base, motor 270 driving a shaft 272 which is coupled to a gear set 273. Shaft 275 driven by gear set 273 is connected through friction clutch element 276 to horizontal printer drive shaft 277, the latter extending parallel to the rails of the printer bed along side thereof and being journaled at its two ends in bearings 278 and 279. Shaft 277 is cut from end to end with a key way 280.

Figures 8, 11, 12:
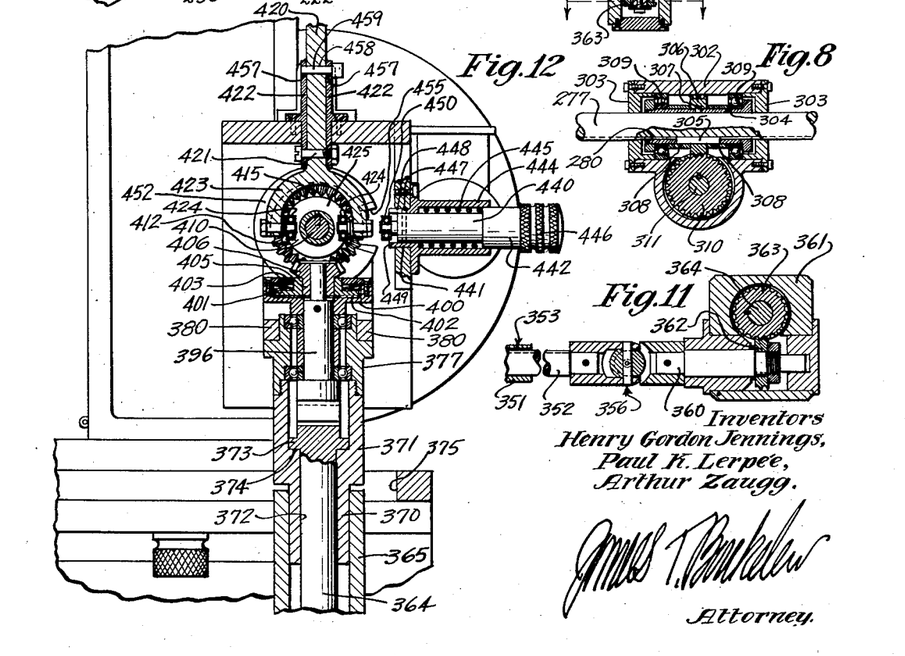
Fig. 8 is a detail section taken on line 8—8 of Figs. 1 and 7.
Fig. 11 is a section taken as indicated by line 11—11 of Fig. 6.
Fig. 12 is a section taken as indicated by line 12—12 of Fig. 6.

Secured to side wall 94 of the supporting casting 85, as by means of screws 300, is a bearing bracket 301 (Figs. 1 and 7), said bracket embodying a tubular housing portion 302 surrounding horizontal shaft 277 and closed at its ends by caps 303 (see also Fig. 8). Mounted on shaft 277 within housing 302 is a sleeve 304, key 305 engaging shaft keyway 280 to hold said sleeve against rotation on the shaft. A spiral gear 306 is keyed on sleeve 304 by means of key 307. This gear 306, which is held in axial position between spacers 308 engaging bearings 309 mounted in the housing, meshes with a spiral gear 310 on the lower end of a vertical shaft 311 journaled in bearings 312 and 313 carried by tubular housing portion 314 (see Fig. 7). It will be evident that as the projection screen carriage is moved longitudinally on the bed rails, gear housing 302 will slide along shaft 277 on which gear sleeve 304 is splined.

On the upper end of shaft 311 is fastened a spiral gear 318, which meshes with a spiral gear 319 splined on a horizontal, transversely extending shaft 320 (Fig. 9). As here shown, gear 319 is fast on a sleeve 321, which in turn is splined to shaft 320 by means of key 322 and keyway 323. Sleeve 321 is journaled in bearings 324 carried by tubular housing portion 325, as in the manner clearly shown in Fig. 9. The inner end of shaft 320 is journaled in suitable bearings carried by a housing 330 (Figs. 9 and 10). Fast on shaft 320 within housing 330 is a spiral gear 331, and meshing therewith is a spiral gear 332 which is fast on the lower end of a vertical shaft 333 extending upwardly through the previously mentioned hollow shaft or sleeve 247 which forms the lower pivot for the swinging camera carriage. Shaft 333 is journaled within hollow shaft or sleeve 247 at its upper and lower ends by means of flanged bearings 335 and 336, respectively, the flange of member 335 seating downwardly on the upper end of sleeve 247, and the flange of bearing 336 seating upwardly against the lower end of sleeve 247, as clearly shown in Fig. 10. A collar 338 formed on shaft 333 immediately above gear 332 engages the underside of upper housing wall 330a to support housing 330 adjacent the lower end of bearing 336, and the collar of a bevel gear 340 pinned on the upper end of shaft 333 engages the upper end of bearing 335 to support the shaft in proper vertical position.

Bevel gear 340 meshes with a bevel gear 341 fast on the end of a horizontal shaft 342 journaled in bearings 343 and 344 which are carried by a tubular shaft housing 345 mounted fast on the upper side of camera carriage yoke 246, as by screws 346. Housing 345 extends forwardly through an aperture 347 formed in the web 245a of carriage casting 245, as clearly shown in Fig. 10. The forward end of shaft 342 has a universal coupling at 350 to a drive sleeve 351, which telescopically receives a drive shaft 352, telescopic members 351 and 352 having a splined driving connection, as indicated at 353 in Fig. 11. The forward end of drive shaft 352 has a universal coupling at 356 to one end of a shaft 360, which is journaled in the lower end of a housing 361. Mounted fast on shaft 360 within housing 361 is a spiral gear 362, which meshes with a spiral gear 363 on the lower end of a vertical shaft 364 that extends upwardly through the tubular vertical extension 365 of housing 361.

Housing portion 365 and shaft 364 extend upwardly on a line to the rear of camera platform 230, as shown in Figs. 1 and 6. The upper end of housing portion 365 receives and is tightly clamped over a reduced tubular extension 370 of a housing member 371, said member having bore 372 which is rotatably fitted by the upper end of shaft 364. Shaft 364 is supported vertically by means of collar 373 which seats on annular housing shoulder 374. Housing 371 extends upwardly through an aperture 375 in camera carrier plate 210, and is screwthreaded at its upper end, as at 376, to a tubular fitting 377 secured to and extending through the lower side of a cradle member 380.

This cradle 380 has two upwardly extending supporting arms 381 and 382, arm 381 being mounted adjacent the rear face of a support 383 secured to the rear side of the camera body, and arm 382 being mounted adjacent the inner face of a support 384 which is slidably mounted on a base 384a secured down to camera carrying plate 210 to the rear of the camera body, as shown in Fig. 6. Bores 385 and 386 are provided in supporting members 383 and 384, respectively, in line with camera drive shaft 378, and arms 381 and 382 have bores 387 and 388 which are respectively adapted to register therewith. A bearing 390 extending from bore 385 into cradle arm bore 387 and a bearing 391 extending from bore 386 into cradle arm 388 support the cradle for swinging movement on the axis of camera drive shaft 378.

The upper end of shaft 364 is drivingly coupled at 395 to a shaft 396 which extends upwardly through and has bearing in member 377. Pinned on the upper end of shaft 396, above member 377, is the lower disk element 400 of a friction disk clutch (Fig. 12). Above element 400 is a disk 401, and between members 400 and 401, is a friction washer 402, clutch members 400 and 401 being pressed together by means of spring washer 403. Member 401 is splined on the shank 405 of a bevel gear 406. This friction clutch between gear 406 and shaft 396 permits slippage in the event the camera mechanism driven from gear 406 should jam.

Journaled in the previously mentioned bearings 390 and 391 is a shaft 410, which is drivingly coupled at 411 to camera drive shaft 378, and splined on shaft 410 immediately over bevel gear 406 is a gear shifting member 412. On one end of member 412 there is fastened a bevel gear 413, which is adapted to mesh with bevel gear 406 when member 412 is moved toward the left from the position shown in Fig. 6. Fast on a reduced extension 414 of shifting member 412, on the other side of bevel gear 406, is a bevel gear 415 which is adapted to mesh with bevel gear 406 when member 412 is moved toward the right from the position of Fig. 6. For the purpose of so shifting member 412, there is provided a manual shifting lever 420, which is pivoted on a pin 421 carried by supporting plates 422 (Fig. 12), and has on its lower end a fork 423 carrying rollers 424 which engage in an annular groove 425 formed in the periphery of shifting member 412. Lever 420 is provided on its upper end with a manual thumb piece 430, and is held normally in the center position of Fig. 6 by means of spring urged centering plungers 431 and 432 which engage it from opposite sides. These centering devices return the lever and shifting member to center position to disengage gears 413 or 415 from driving gear 406 when the shifting lever is released.

It will now be evident that when lever 420 is shifted in one direction from center, say to the right, shifting member 411 is caused to slide on shaft 410 until bevel gear 413 is in driving engagement with bevel gear 406, whereupon shaft 410 and the camera drive shaft are driven in one direction of rotation; and when lever 420 is moved to the left from center, shifting member 412 is moved to the right on shaft 410 until bevel gear 415 comes into driving engagement with bevel gear 406, thereby causing shaft 410 and the camera drive shaft to be driven in the reverse direction of rotation. Operation of lever 420 thus engages the camera drive means with the camera mechanism, and the direction of drive of the camera depends upon the direction in which lever 420 is shifted.

Stop means are provided to enable driving the camera mechanism in a manner to move the film one frame length at a time, and then to stop. The camera drive shaft 378 will be understood to be so geared to the camera mechanism as to cause the film to be advanced one frame length for each revolution. The stop means comprises a plunger, indicated at 440 in Figs. 6 and 12, which is reciprocable through a mounting tube 441 on a line intersecting shaft 410 at the location of shifting member extension 414. Plunger 440 has an enlarged portion 442 working in enlarged tube portion 444, and a spring 445 acts on the plunger to urge it to move outwardly in its tube, as will be understood from the drawings. This plunger has a handle portion 446 on its outer end. The inner end of the plunger carries a pin 447 which is adapted to be received in either of two slots 448 and 449 cut in the end of tube 441, slot 449 being considerably shorter than slot 448 and maintaining the plunger in a position to the left of that illustrated in Fig. 12 when pin 447 is placed therein. The position shown with pin 447 in slot 448, is an inoperative position for the stop motion device.

To place the stop motion mechanism in operation, the plunger is forced to the left against spring 445 to disengage pin 447 from slot 448, and is then given a half turn so that pin 447 will be received in slot 449 when the plunger is released. In the resulting position (not illustrated) a roller 450 carried by the inner end of the plunger takes a forward position in which it may be received within a notch 455 cut in a flange 452 which is formed on a member 453 set tightly on shifting member extension 414. Roller 450 is received within this notch 455 in flange 452 when the shifting member by which it is moved is in the center position of Fig. 6.

Assuming now that it is desired to drive the camera mechanism one frame length, and that bevel gear 406 is being driven from printer drive shaft 277 through the described driving train, lever handle 430 is moved say to the right, thereby causing shifting member 412 to move to the left to engage bevel gear 413 with bevel gear 406. At the same time, this movement of member 412 shifts flange 452 over to the left until it is free of roller 450 on plunger 440, thereby freeing member 453, as well as shaft 410 on which it is non-rotatably mounted, for rotation by operation of meshed gears 406 and 413. It will be obvious that during such rotation flange 452 is to one side or the other of roller 450, depending upon the direction in which the shifting assembly was moved. Immediately that flange 452 is thus freed of roller 450 and starts to rotate, handle 430 may be released, thus leaving the roller under the influence of the retracted spring centering plunger which is acting to press the roller against the side of the flange; and when flange notch 455 is again opposite roller 450, at the completion of a revolution of the flange with shaft 410, the flange and shifting member accordingly are moved by the centering plunger back to center position, roller 450 being received back in notch 455, and gears 413 and 406 being disengaged to stop the drive of the camera. The operation of the stop motion mechanism is similar when handle 430 is moved initially to the left, the stop motion roller in this case simply riding on the opposite side surface of flange 452 until a complete revolution of shaft 410 is completed.

Thus by successive short actuations of control lever 420, the camera may be caused to move in either direction through single successive "frame lengths" of operation. It may here be noted that the stop motion device is so timed as to stop the camera in a closed shutter position, so that the film will not be exposed between successive camera movements. Such stop motion operation of the camera is well known to be necessary in certain types of shots such as the present printer is designed to make, as for instance where the camera position, or the position of certain mats, must be slightly shifted between successive exposures.

When it is desired to drive the camera with continuous motion, plunger 440 is placed in the inoperative position of Fig. 12. In order to relieve the operator from the necessity of keeping his hand on lever handle 430 during such continuous operation, lever supporting plates 422 and lever 420 are provided with apertures 457 and 458, respectively, which are adapted to register when the lever is in either of the two gear-engaged positions, and a pin 459 is provided which may be placed in the registered apertures to lock the device in those positions (see Fig. 12).

It will now be evident that the camera is provided with a positive drive means which is derived from motor drive shaft 277, and that this drive is uninterfered with throughout longitudinal or transverse movements of camera carrier supporting platform 98 relative to the printer bed, since the gear 306 through which power is taken of shaft 277 is splined on said shaft and slides longitudinally thereon as carriage 65 and platform 98 carried thereon are moved longitudinally on the bed rails, while transverse movement of platform 98 is taken care of by sliding of connecting shaft 320 longitudinally through the splined driving gear 319 (Fig. 9). And the drive of the camera is likewise uninterfered with as the camera carrier is swung on its pivot axis, because of the operative interconnection means which is placed on the axis of swing (Fig. 10). The telescoping driving sleeve 351 and shaft 352, with the universal joints at 350 and 356, allow the camera itself to be adjusted in position on the swinging carrier.

Figure 14:
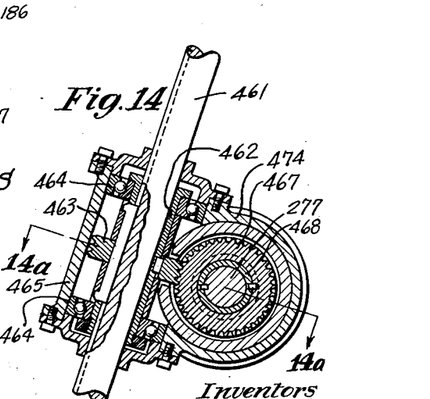
Fig. 14 is a detail section on line 14—14 of Fig. 1.

The projector P has a reversing and stop motion drive mechanism 460 similar to that provided for the camera, and it will therefore not be necessary to describe it in detail. This projector drive mechanism 460 is driven by a drive shaft 461, which is driven from shaft 277 in the manner shown in Figs. 14 and 14a. As there indicated, shaft 461 has splined thereon a sleeve 462, on which is tightly mounted a spiral gear 463. Sleeve 462 is mounted in bearings 464 carried by a housing 465 through which shaft 461 is adapted to slide. Gear 463 meshes with a spiral gear 467 which is tightly mounted on a sleeve 468 splined on shaft 277. Sleeve 468 is mounted in bearings 469 carried by tubular member 470, and is confined between spacing sleeves 471 and 472 mounted between bearings 469. Tubular member 470 is embraced at one end by housing portion 474, which is an integral part of housing 465, and its other end is rotatable in a fixed support 475 which is mounted on the side of the printer bed. Housing 465 through which shaft 461 is slidingly received is thus capable of rotation on the axis of shaft 277, so that as the position of the projector is adjusted transversely with reference to the printer bed, shaft 461 simply slides longitudinally through gear 463 and sleeve 462 mounted in housing 465 and said housing and gear rock on the axis of shaft 277 to accommodate the accompanying angular adjustment of shaft 461.

Figure 13:
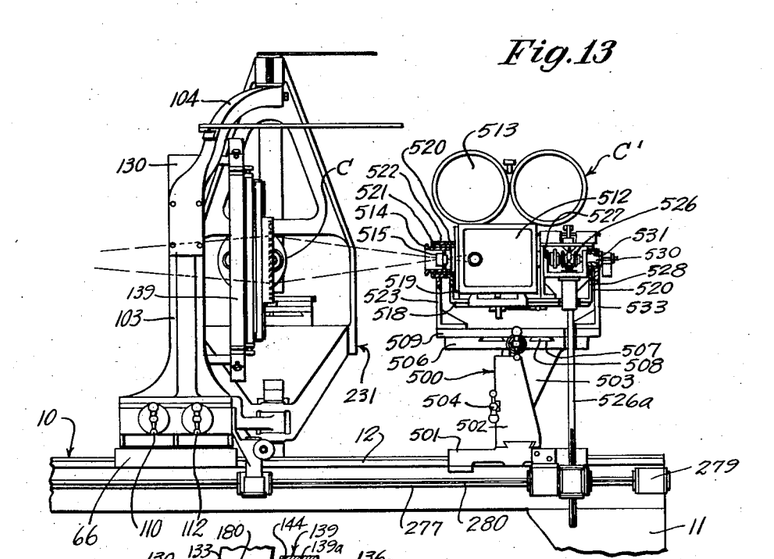
Fig. 13 is an elevational view showing a portion of the printer with an alternate camera mounting in place.

Fig. 13, which is a side elevation of a portion of the printer shown in Fig. 1, shows an alternative camera mounting 500. The swinging carrier 231 for camera C is swung to one side when mounting 500 is utilized, as shown. There is then mounted on the right hand end of bed rails 12 and 13 a supporting base 501, which is substantially like projector supporting base 15, and is slidable longitudinally on the bed rails for longitudinal adjustment of the camera position. Base 501 carries a vertically extending casting 502, which in turn supports a camera elevator casting 503, members 502 and 503 being respectively like members 15 and 20 of the projector mounting, and therefore not being illustrated in detail. It will be understood that rotation of crank 504 causes vertical adjustment movement of elevator 503 on supporting member 502, similar to the manner of effecting vertical movement of the projector elevator by operation of crank 36.

The flat upper surface 506 of member 503 is cut with a dovetail way 507 receiving a dovetail 508 on the underside of a camera carrying platform 509 which rests on member 506. Camera carrying platform 509 will be seen to be capable of adjustment longitudinally of the printer bed by movement of base 501 on the bed rails, of vertical adjustment by elevation of lowering of member 503 on member 502, and of adjustment transversely of the bed rails by sliding laterally on member 506.

The camera C', which embodies body 512, magazine 513, and lens mount tube 514 having lens combination 515, is mounted to swing on a longitudinnal axis coinciding with the optical axis of lens 515. The camera body is secured down on a cradle base 518, and said base has an upstanding arm 519 immediately in front of the camera body and an upstanding arm 520 spaced somewhat to the rear of the camera body. At the upper end of arm 519 is a bearing ring 520, which is concentric with the optical axis of lens 515. Received within this ring is a lens mount supporting bushing 521 and supporting and surrounding the forward end of said bushing 521 is a bearing ring 522 which is formed on the upper end of a standard 535 mounted at the forward end of platform 509. The previously described lens mount tube 514 is received within bushing 521, as indicated. A reversing and stop motion drive mechanism 526 similar to that described for camera C is provided for the drive of camera C', and this mechanism 526 need not be detailed since it may be substantially the same as that described for camera C. Mechanism 526 is driven by a shaft 526a which is driven from shaft 277 in the manner shown in Figs. 14 and 14a. Mechanism 526 is arranged with its horizontal camera driving shaft 527 on the axis of the lens 515. The rearward arm 528 of drive mechanism cradle 518 supports a sleeve 530 surrounding the rearward portion of shaft 527, and sleeve 530 has bearing in a bushing 531. The rearward end of bushing 531 is supported by a bearing on the upper end of a standard 533 mounted at the rear end of platform 509, while the upper end of the aforementioned cradle arm 530 is rotatably mounted on the inner end of bushing 531. It will be evident that the entire camera and its supporting cradle may be rotated on the longitudinal axis of the camera lens, while its drive mechanism 526 remains in fixed operative position. The camera may therefore be turned on this axis while in operation.

The use of the printer will now be illustrated by a description of several typical effects obtainable therewith.

One effect which the printer is designed to produce may be described as a "book-leaf" effect. In such an effect, one scene turns forwardly about one of its side edges and passes out of view to the side, uncovering the next scene behind it, just as in turning a page of a book. One or both of the successive scenes may contain action throughout the transition. This effect is accomplished through use of the swinging action of the camera carrier 231, which is gradually moved on its axis from the position of Fig. 1 through an arc of ninety degrees as the scene on the projection screen is photographed in the camera. It will be evident that this is relatively the same as turning the projection screen on the same vertical axis in a direction toward the camera. The picture photographed by the camera is therefore the same as though the projection screen and image projected thereon, rather than the camera, had been swung about the pivot axis.

Fig. 22 shows how the printer is adjusted to accomplish the effect described in preceding paragraph. As there indicated, projector P and camera C are alined on a common optical axis R—R', the camera being focussed on the image area A of projection screen S, while the vertical pivot axis $a$ of the camera carrier is located in the plane of screen S and at the left hand edge of area A (as viewed from the camera). This adjustment may be accomplished by first placing the projector in a suitable position, then moving the screen and camera supporting platform 98, by means of crank 110, until the pivot center of the swinging camera carrier is at the edge of area A, and finally shifting the position of the camera on carrier platform 230 until its field of view coincides with image area A. The latter adjustment may be made by operation of crank 240 to shift the camera transversely across platform 230, the swinging carrier being held in such a position that the optical axis of the camera remains parallel to the optical axis of the projector while being brought into coincidence therewith. The camera adjustment may also be accomplished by loosening camera base clamping nut 216 (Fig. 6), and then bringing the camera into the required position by a swing of the camera carrier until the camera lens is in the extended line of the projector axis, followed by a pivotal adjustment of the camera body on base plate 211 about the axis of pivot pin 212 (which passes through the rear nodal point of the camera lens), until the camera axis coincides with the projector axis. In either event, the resulting relative positions of projector, camera carrier pivot and camera are as shown in Fig. 22.

The projector is threaded with the positive film, arranged with its emulsion side toward the projection lens (to avoid a right-for-left reversal in the negative), and the camera is threaded with a fresh negative film in the usual manner. The magnification of projection may be adjusted by shifting of the projector longitudinally relatively to the screen and focusing of lens L, to give the desired size of image on the screen. The camera lens is then so adjusted and focused that its angle of view just covers the area of the projected image.

The room being darkened, and the camera being in the full line position of Fig. 22, the projector is then operated to project an image of one film frame on the screen, and an exposure is made in the camera, which is preferably accomplished by one manual actuation of the camera stop motion mechanism, causing the exposure to be made and the film to be advanced one frame length. The camera carrier is then swung through a suitable predetermined angle toward the right, the projector stop-motion mechanism is actuated to advance the positive film and project the next positive frame, and the camera stop-motion mechanism is actuated to expose the next negative frame from the new camera position.

The camera carrier may be steadied in each such position by means of a releasable clamp device 600 on swinging member 250 which is adapted to be clamped to a semi-circular plate 601 mounted on yoke 104 (see Fig. 1). The distance the camera is moved for each new exposure may be measured by means of a semicircular plate 604 stationarily mounted on top of camera carrier pivot pin 251, and a pointer 605 carried by the swinging carrier, said plate 604 being provided with any suitable scale.

In this way the camera is gradually moved over to the dotted line position shown in Fig. 22, the image on the screen, relatively speaking, moving out of the field of view of the camera toward the left.

It will be evident that with the movements described the space relations between the projection screen image and the camera are exactly the same as though the projection screen and image thereon had been pivoted forwardly (toward the camera) about a vertical axis coinciding with the left hand edge of the screen image. In other words, the appearance to the camera is the same as though the image on the screen turned forwardly and off to the side just as in turning the page of a book.

To complete the effect, the camera is swung back to its original position, the film in the camera is run backwardly to the beginning point of the shot, and the positive film with the next scene is placed in the projector. The scene on the positive is now to be photographed on the negative on the area gradually uncovered by the turning first scene. To accomplish this, a sliding opaque mat is used, and is placed for instance in the horizontal guide ways 181 provided to the rear of the projection screen. The positive and negative film in the projector and camera are now advanced, frame by frame, with the camera remaining in the full line position of Fig. 22, and before each exposure the sliding mat is adjusted to such a position as to mask the area of the projection screen corresponding to the negative film area which was previously exposed during the "swinging" shot. The successive positions for this mat may easily be calculated if the position of the camera carrier for each exposure throughout the "swing" is noted down. It will be evident that there is thus provided an effect in which one scene turns forwardly toward the observer and passes off to the side, uncovering another scene behind it, just as in turning the page of a book. It will be obvious that this book leaf shot is designed particularly for scenes which contain action. If the first scene, which is to be made to appear to turn off to the side, does not contain action in any instance, it will of course not be necessary to advance the film in the projector between successive camera exposures.

Many novel fade-outs and fade-ins are possible with the printer. As one instance, assume the printer to be set up with the projector and camera axes on a line passing through the projection screen pivot axis which is defined by pivots 152 (Fig. 18). Such an arrangement s indicated in Fig. 23. In this shot the image on projection screen S is photographed from a fixed camera position while the projection screen is swung on its axis, step-by-step, until it has moved from a normal starting position through an angle of substantially 90 degrees, as to the position shown in dotted lines in Fig. 23. The resulting effect is that the two halves of the projection screen on the two sides of the pivot axis are gradually moved out of focus, and cause a corresponding novel fading of the picture. The next scene is "faded in" by running the film back a suitable number of feet, and then, starting with the projection screen in the dotted line position of Fig. 23, gradually moving it back to its normal position, thereby gradually swinging the two halves of the scene into focus.

It will be obvious that the last described effect may be varied by swinging the projection screen on an axis coinciding with one edge of the image area. To accomplish this, the camera and projector as well as the projection screen frame 165 may be shifted to one side until the edge of image area A coincides with the axis of pivots 152. As an alternative method, the pivot axis may be changed by placing the pivot pins in the offset sockets 159.

Further, the axis defined by pivots 152 need not always be vertical, but can be placed at any angle simply by rotating the screen assembly in supporting rings 139.

It is sometimes desirable to add a foreground component to the scene projected on the screen. The clear glass screen 187 mounted in front of screen S serves as a carrier for such a component, which may consist of trees, shrubbery, mattes, etc., and may simply be painted on said screen 187.

It is sometimes desired to take a panning or horizontally moving shot of the scene on screen S, before which may be a foreground component, such as a painting on screen 187. In order to maintain the perspective relations and the line up of foreground and background objects accurate throughout such a shot, it is necessary to pan by swinging the camera on an axis through the rear nodal point of its objective lens. Accordingly, for such a shot, the camera clamping nut 216 is released, and the panning is accomplished by swinging the camera on pivot 212, the camera lens being so adjusted that the pivot axis of the camera passes through the rear nodal point of the camera lens.

Figures 23, 24:
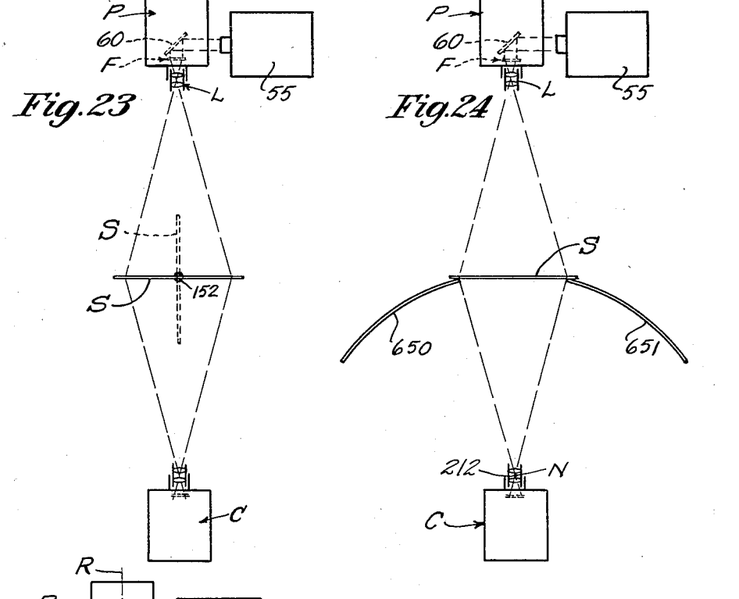
Fig. 23 is another diagrammatic view illustrating another special shot which may be carried out with the printer.
Fig. 24 is another diagrammatic view illustrating another special shot which may be carried out with the printer.

A somewhat different type of panning shot is indicated in Fig. 24. In this set up the projector P and camera C are again focused on projection screen S. To the sides of screen S are mounted paintings of scenery, as at 650 and 651. The camera is arranged for panning, as by adjusting it for swinging movement on its nodal point pivot at 212 (Fig. 6). The two paintings are curved into an arc which has its center at the pivot center 212 about which the camera swings, and the paintings may be supported in any suitable manner, as for instance by mounting them on the supports 186 (Fig. 21). One of the paintings is designed to match up with one edge of a projected image. The shot is started with the camera taking in only the projected image, and the camera is then swung so as to move its field of view off the projected image on the screen and onto the scenery of the painting 650. The camera may then be stopped and trained on the other painting 651, which is painted to match up with the next scene to be projected on the screen. The projector being operated to project the next scene, the camera is then operated to take first the scenery on the painting 651, and is then swung gradually over so that its field of view finally coincides with the new projected scene. There is thus produced a novel transition from one scene to the next. Swinging the camera on the nodal point during this shot maintains the camera in focus on the screen and curved paintings throughout the taking.

The camera mounting shown in Fig. 13 enables production of turning effects, wherein the scene appears to turn on an axis perpendicular to its plane. Such a movement is useful, for instance, in accomplishing air-plane or boat effects.

From what has now been said it will be understood that we have provided a printer which is capable of producing a wide variety of special effects, and that provision has been made for numerous adjustments and relative movements of the several components of the device, to the end that those skilled in the art may readily individually devise.

It will be understood that the drawings and description are to be considered merely as illustrative of and not restrictive on the broader claims appended hereto; for various changes in design, structure and arrangement may be made without departing from the spirit and scope of said claims.

We claim:

1. In a printer of the character described, the combination of a projector, a projection screen adapted to receive an image projected by said projector, a camera adapted to photograph the image on said screen, and a swinging carriage for the camera movable relatively to the projection screen on a pivot axis which lies substantially in the plane of said projection screen.

2. In a printer of the character described, the combination of a projector, a projection screen adapted to receive an image projected by said projector, a camera adapted to photograph the image on said screen, a swinging carriage for the camera movable relatively to the projection screen on a pivot axis which lies substantially in the plane of said projection screen, and a pivot mounting for the camera on said carriage having a vertical pivot axis which intersects the rear nodal point of the camera lens.

3. In a printer of the character described, the combination of a projector, a projection screen adapted to receive an image projected by said projector, a camera adapted to photograph the image on said screen, and a swinging carriage for the camera movable relatively to the projection screen on a vertical pivot axis which lies substantially in the plane of said projection screen.

4. In a printer of the character described, the combination of a base, a projector mounted on said base, a projection screen mounted on said base in a position to receive an image projected by said projector, a camera, a swinging camera carriage adapted to support said camera in positions to photograph the image on said screen, said camera carriage having a vertical pivot axis which lies substantially in the plane of said projection screen, and means for shifting the position of said pivot axis in the plane of the projection screen relatively to the projected image area on the screen.

5. In a printer of the character described, the combination of a base, a projector mounted on said base, a projection screen mounted on said base in a position to receive an image projected by said projector, a camera, a swinging camera carriage adapted to support said camera in positions to photograph the image on said screen, said camera carriage having a pivot axis which lies substantially in the plane of said projection screen, means for shifting the position of said pivot axis in the plane of the projection screen relatively to the projected image area on the screen, and means for shifting the camera on its carriage to aline it with the projected image area on the screen.

6. In a printer of the character described, the combination of a base, a projector mounted on said base, a projection screen mounted on said base in a position to receive an image projected by said projector, a camera, a swinging camera carriage adapted to support said camera in positions to photograph the image on said screen, said camera carriage having a pivot axis which lies substantially in the plane of said projection screen, means for shifting the position of said pivot axis in the plane of the projection screen relatively to the projected image area on the screen, and means for shifting the camera on its carriage to aline it with the projected image area on the screen, said means comprising a vertical pivot mounting for the camera on the carriage having a pivot axis passing substantially through the rear nodal point of the camera lens.

7. In a printer of the character described, the combination of a base, a projector mounted on said base, a projection screen mounted on said base in a position to receive an image projected by said projector, a camera, a swinging camera carriage adapted to support said camera in positions to photograph the image on said screen, said camera carriage having a pivot axis which lies substantially in the plane of said projection screen, means for shifting the position of said pivot axis in the plane of the projection screen relatively to the projected image area on the screen, and means for shifting the camera on its carriage in a direction parallel to the projection screen to aline it with the projected image area on the screen.

8. In a printer of the character described, the combination of a base, a projector mounted on said base, a projection screen mounted in a position to receive an image projected by said projector, a supporting member carried by the printer base and horizontally shiftable thereon in a direction parallel to the plane of the projection screen, a camera, a swinging camera carrier having a vertical pivot mounting on said supporting member on an axis which lies substantially in the plane of the projection screen, and means for adjusting the position of the camera on said carrier to aline with the image projected on the screen by the projector.

9. In a printer of the character described, the combination of a base, a projector mounted on said base, a projector screen mounted in a position to receive an image projected by said projector, a supporting member carried by the printer base and horizontally shiftable thereon in a direction parallel to the plane of the projection screen, a camera, a swinging camera carrier having a vertical pivot mounting on said supporting member on an axis which lies substantially in the plane of the projection screen, and means for laterally moving the camera on the camera carrier to aline with the image projected on the screen by the projector.

10. In a printer of the character described, the combination of a base, a projector laterally shiftable on said base, a projection screen mounted in a position to receive an image projected by said projector, a supporting member carried by and horizontally shiftable on the carrier base in a direction parallel to the plane of the projection screen, a camera, a swinging camera carrier having a vertical pivot mounting on said supporting member on an axis which lies substantially in the plane of the projection screen, and means for adjusting the position of the camera on said carrier to aline it with the image projected on the screen by the projector.

11. In a projector of the character described, the combination of a base, a projector mounted on said base, a supporting member carried by the base and movable thereon toward and from the projector and also horizontally in a direction parallel to the plane of the projection screen, a projection screen mounted on said supporting member, a camera, a swinging camera carrier having a vertical pivot mounting on said supporting member, and means for adjusting the position of the camera on said carrier to aline with the image projected on the screen by the projector.

12. In a printer of the character described, the combination of a base, a projector mounted on said base, means for driving said projector, a projection screen positioned to receive an image projected by said projector, a camera, a swinging camera carrier supported by said base and adapted to carry the camera in positions to photograph the image on said screen, said camera carrier having a pivot joint on a vertical axis about which the camera carrier swings, and camera drive means embodying a rotatable shaft concentric with the axis of said pivot joint, means on the printer base for driving said shaft, and means operatively interconnecting said shaft with the camera.

13. In a printer of the character described, the combination of a base, a projector mounted on said base, means for driving said projector, a projection screen positioned to receive an image projected by said projector, a camera, a swinging camera carrier supported by and movable horizontally across said base in a direction parallel to the plane of the projection screen, said camera carrier having a pivot joint on a vertical axis about which the camera carrier swings, and camera drive means embodying a rotatable vertical shaft supported by the camera carrier on an axis concentric with the axis of said pivot joint, gear means on the camera carrier for driving said shaft, means on the printer base for driving said gear means, means including a horizontal splined shaft for interconnecting said driving means with said gear means in all positions of the camera carrier on the printer base, and means operatively interconnecting said vertical shaft with the camera.

14. In a printer of the character described, the combination of a base, a projector mounted on said base, means for driving said projector, said means including a stop motion mechanism, a projection screen positioned to receive an image projected by said projector, a camera, a swinging camera carrier supported by said base and adapted to carry the camera in positions to photograph the image on said screen, said camera carrier having a pivot joint on a vertical axis about which the camera carrier swings, and camera drive means embodying a rotatable shaft concentric with the axis of said pivot joint, means on the printer base for driving said shaft, and means operatively interconnecting said shaft with the camera, said means including a stop motion mechanism.

15. In a printer of the character described, the combination of a base, a projector mounted on said base, a supporting member mounted on said base in front of the projector for horizontal movement transverse to the axis of projection of said projector, a frame vertically adjustable on said supporting member, a projection screen carried by said frame, and a camera mounted on said supporting member in a position to photograph the image projected on the screen.

16. In a printer of the character described, the combination of a base, a projector mounted on said base, a supporting member mounted on said base in front of the projector for movement transverse to the axis of projection of said projector, a frame vertically adjustable on said supporting member, a projection screen carried by said frame, mat holding means carried by said frame adjacent said screen, and a camera mounted on said supporting member in a position to photograph the image projected on the screen.

17. In a projector of the character described, the combination of a base, a projector mounted on said base, a supporting member carried by the base and movable thereon toward and from the projector and also horizontally in a direction parallel to the plane of the projection screen, a projection screen mounted on said supporting member, a camera, a swinging camera carrier having a vertical pivot mounting on said supporting member, and means for adjusting the position of the camera in a forward and rearward direction on said carrier.

18. In a projector of the character described, the combination of a base, a projector mounted on said base, a supporting member carried by the base and movable thereon toward and from the projector and also horizontally in a direction parallel to the plane of the projection screen, a projection screen mounted on said supporting member, a camera, a swinging camera carrier having a vertical pivot mounting on said supporting member, means for adjusting the position of the camera, and means for adjusting the camera in a lateral direction on said carrier to aline it with the image projected on the screen.

19. In a printer of the character described, the combination of a base, a projector mounted on said base, a projection screen positioned to receive an image cast by said projector, a camera having an objective lens, a camera carriage adapted to support the camera in a position to photograph the image on the projection screen, a pivot mounting for the camera on said carrier on a horizontal longitudinal axis that coincides with the optical axis of the camera lens, a camera drive shaft coincident with said axis, a gear on said shaft, and a drive gear adapted to mesh therewith mounted independently of the pivotally supported camera.

20. In a printer of the character described, the combination of a base, a projector mounted on said base, a projection screen positioned to receive an image cast by said projector, a camera having an objective lens, a camera carriage adapted to support the camera in position to photograph the image on the projection screen, a pivot mounting for the camera on said carrier on a horizontal longitudinal axis parallel to the optical axis of the camera lens, a camera drive shaft coincident with said axis, a gear on said shaft, and a drive gear adapted to mesh therewith mounted independently of the pivotally supported camera.

HENRY GORDON JENNINGS.
PAUL K. LERPÉE.
ARTHUR ZAUGG.